United States Patent
Zhang et al.

(10) Patent No.: US 11,566,333 B2
(45) Date of Patent: Jan. 31, 2023

(54) METHOD FOR CLEANLY EXTRACTING METALLIC SILVER

(71) Applicant: INSTITUTE OF PROCESS ENGINEERING, CHINESE ACADEMY OF SCIENCES, Beijing (CN)

(72) Inventors: Hui Zhang, Beijing (CN); Xulong Dong, Beijing (CN); Tao Qi, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 308 days.

(21) Appl. No.: 16/647,530

(22) PCT Filed: Jul. 13, 2018

(86) PCT No.: PCT/CN2018/095674
§ 371 (c)(1),
(2) Date: Mar. 16, 2020

(87) PCT Pub. No.: WO2019/056837
PCT Pub. Date: Mar. 28, 2019

(65) Prior Publication Data
US 2022/0112616 A1    Apr. 14, 2022

(30) Foreign Application Priority Data

Sep. 21, 2017 (CN) .......................... 201710859553.6

(51) Int. Cl.
| | | |
|---|---|---|
| *H01M 10/38* | (2006.01) | |
| *C25C 1/20* | (2006.01) | |
| *C22B 3/04* | (2006.01) | |
| *C22B 3/06* | (2006.01) | |
| *C25C 7/02* | (2006.01) | |
| *C25C 7/04* | (2006.01) | |

(52) U.S. Cl.
CPC ................ *C25C 1/20* (2013.01); *C22B 3/045* (2013.01); *C22B 3/065* (2013.01); *C25C 7/02* (2013.01); *C25C 7/04* (2013.01)

(58) Field of Classification Search
CPC .. C22B 3/04; C22B 3/045; C25C 1/20; C25C 1/00; C25C 7/00; C25C 7/06; C25C 7/08
See application file for complete search history.

(56) References Cited

U.S. PATENT DOCUMENTS 4,437,889 A    3/1984  Palacios-Mendoza

FOREIGN PATENT DOCUMENTS

| CN | 101901937 A | 12/2010 | |
|---|---|---|---|
| CN | 101914785 A | 12/2010 | |
| CN | 102041393 A | 5/2011 | |
| CN | 102260880 A | 11/2011 | |
| CN | 101914785 B | 5/2012 | |
| CN | 106629738 A | 5/2017 | |
| CN | 107674992  * | 2/2018 | ............... C25C 7/00 |
| CN | 107674992 A | 2/2018 | |

OTHER PUBLICATIONS

Ren, Xiulian; Electrochemical oxidation of Ce(III) to Ce (IV); 2010; Hydrometallurgy; pp. 205-210) (Year: 2010).*
Sun P-P,"Recovery of Silver from the Nitrate Leaching Solution of the Spent Ag/α-Al2O3 Catalyst by Solvent Extraction", Industrial & Engineering Chemistry Research, 2014, 53, 20241-20246.

* cited by examiner

*Primary Examiner* — Zulmariam Mendez
(74) *Attorney, Agent, or Firm* — Bayramoglu Law Offices LLC

(57) ABSTRACT

A method for cleanly extracting metallic silver includes: mixing an acidic solution containing $Ce^{4+}$ and $NO_3^-$ with a silver-containing material for leaching; after the leaching is completed, carrying out a solid-liquid separation to obtain a leaching solution containing $Ce^{3+}$ and $Ag^+$; and electrolyzing the leaching solution, wherein an oxidation reaction of $Ce^{3+}$ occurs at an anode to realize a regeneration of $Ce^{4+}$ and an electrolytic reduction occurs at a cathode to reduce $Ag^+$ to obtain the metallic silver. $Ce^{4+}$ is used as a leaching agent and an intermediate oxidant to implement a cyclic operation of solution leaching and electrolytic regeneration on the silver-containing material. Almost no $NO_x$ and waste liquid are caused by the extraction process, and the invention is clean and environmentally friendly.

8 Claims, No Drawings

METHOD FOR CLEANLY EXTRACTING METALLIC SILVER

CROSS REFERENCE TO THE RELATED APPLICATIONS

This application is the national phase entry of International Application No. PCT/CN2018/095674, filed on Jul. 13, 2018, which is based upon and claims priority to Chinese Patent Application No. 201710859553.6, filed on Sep. 21, 2017, the entire contents of which are incorporated herein by reference.

TECHNICAL FIELD

The present invention relates to hydrometallurgy techniques, specifically to a clean production technique for recovering metallic silver by a wet process, and more specifically to a method for cleanly extracting metallic silver.

BACKGROUND

Silver is an important catalytic material and can be used as an active ingredient in various oxidation catalysts. Also, silver is the most conductive metal and can be made into wires, foils, coatings or electroconduction slurry. Silver has become an indispensable raw material in modern industry with global consumption reaching 31,000 tons in 2014. As silver is a precious metal, the recovery of silver has significant economic value.

Due to the high solubility of silver nitrate in water, silver is generally leached by nitric acid, then silver is precipitated and separated from other metals by using chloride ions as a precipitant, and then silver chloride is reduced by a reductant to obtain metallic silver. For example, Sun P-P (Recovery of Silver from the Nitrate Leaching Solution of the Spent Ag/α-Al$_2$O$_3$ Catalyst by Solvent Extraction, *Industrial & Engineering Chemistry Research*, 2014) uses nitric acid to leach silver from a spent Ag/α-Al$_2$O$_3$ catalyst. This research shows that when the concentration of HNO$_3$ is greater than 1 mol/L, the product of the reaction between silver and HNO$_3$ is NO$_2$ and when the concentration of HNO$_3$ is less than 1 mol/L, the reduction product is NO. After grinding the spent silver-containing catalyst, the researchers used 1 mol/L of dilute nitric acid for a reaction at 70° C. for 2 hours. The final silver leaching rate reached 95%.

The existing common problems of this method are as follows. 1) The reaction of nitric acid with silver will generate a large amount of nitrogen oxide gas; 2) Nitric acid, chlorides, reductants, NO$_x$ exhaust gas absorbents, and other reagents are used in the reaction process, which is not only costly, but also causes a large amount of waste liquid.

To solve the above problems, some researchers have tried to recover metallic silver by an electrolytic technique, where the silver-containing material is placed in an anode box for an electrolytic reaction, and nitric acid and silver nitrate are used as electrolytes, and the metallic silver is obtained at a cathode. For example, CN101914785B discloses a method for recovering silver and copper from silver-copper alloy wastes, where an electrolysis is performed by using a titanium plate as a cathode, loading the silver-copper alloy wastes into an anode titanium basket as an anode, and using silver nitrate solution as an electrolyte to recover electrolytic silver powder.

The disadvantages of this method are as follows. 1) This method is only suitable for materials with good conductivity. For materials with poor conductivity (such as spent catalysts containing silver and alumina support), the anode zone is filled with the spent catalyst. As the electrolysis proceeds, the silver content in the pores gradually decreases, the insulating carrier (alumina, etc.) hinders the passage of current (the resistance increases), the voltage significantly rises, and the power consumption increases. 2) Due to the existence of the insulating carrier, it is difficult for the anode to directly contact the metallic silver in the pores. Therefore, the anode actually undergoes water electrolysis (producing oxygen and nitric acid) rather than the dissolution of metallic silver, resulting in an increasing consumption of silver in the electrolyte, making the electrolysis process unsustainable. Even considering the dissolution effect of newly produced nitric acid on silver, the traditional method still encounters the same problems of producing nitrogen oxides by dissolving silver with nitrogen nitrate. 3) Due to the limitation of the silver nitrate-nitric acid system, in the absence of other intermediary oxidants, the anode should be in direct contact with metallic silver and undergo an electrolytic reaction of silver to achieve a better effect. Moreover, the spent catalyst should be placed in the anode zone and should be as close as possible to the surface of the anode, which still cannot avoid the increase in resistance and the side reaction of silver nitrate dissolving silver caused by the low silver content. 4) When the silver-containing materials are placed in the electrolytic cell, the impurities therein directly enter the electrolyte, which affects the purity of the product, and the addition and discharge of the materials interfere with the electrolytic process, resulting in a complicated operation.

Based on the above reasons, it is necessary to develop a novel process for cleanly extracting metallic silver.

SUMMARY

To solve the above technical problems, the present invention provides a method for cleanly extracting metallic silver. By using Ce$^{4+}$ to perform a cyclic operation of solution leaching and electrolytic regeneration on silver-containing materials, the clean extraction of silver is achieved without generating nitrogen oxides. The extraction process causes almost no waste liquid and waste gas, and is an environmentally friendly process for extracting silver.

To achieve this purpose, the present invention uses the following technical solutions:

The present invention provides a method for cleanly extracting metallic silver. The method includes the following steps:

(1) mixing an acidic solution containing Ce$^{4+}$ and NO$_3^-$ with a silver-containing material for leaching; after the leaching is completed, carrying out a solid-liquid separation to obtain a leaching solution; and (2) electrolyzing the leaching solution obtained in step (1), where an oxidation reaction of Ce$^{3+}$ occurs at an anode to obtain a solution containing Ce$^{4+}$ to achieve a regeneration of Ce$^{4+}$, and a reduction reaction of Ag$^+$ occurs at a cathode to obtain the metallic silver.

In the present invention, Ce$^{4+}$ is used as a leaching agent and an intermediate oxidant. In the step of leaching, a Ce$^{4+}$+Ag→Ce$^{3+}$+Ag$^+$ reaction occurs and a reverse reaction of the reaction occurs during the electrolyzing to obtain metallic silver at the cathode.

In the present invention, Ce$^{4+}$ is used for leaching silver-containing materials instead of traditional nitric acid, and almost no NO$_x$ is generated during the leaching process (no exhaust gas emission). After electrolysis, the regeneration of $Ce^{4+}$ is realized, and the electrolyte can be recycled. The creative combination of these two aspects has the advantages of no exhaust gas, low cost, and more environmentally friendly, while the existing techniques cannot achieve the above objectives together.

According to the present invention, a concentration of $Ce^{4+}$ in the acidic solution containing $Ce^{4+}$ and $NO_3^-$ in step (1) is greater than or equal to 0.1 mol/L. For example, the concentration of $Ce^{4+}$ may be 0.1 mol/L, 0.5 mol/L, 1 mol/L, 1.5 mol/L, 2 mol/L, etc. For the present invention, the concentration of $Ce^{4+}$ in the acidic solution containing $Ce^{4+}$ and $NO_3^-$ is as long as the concentration range permits solubility. The above is presented as an example and is not a limitation.

According to the present invention, a concentration of $H^+$ in the acidic solution containing $Ce^{4+}$ and $NO_3^-$ in step (1) is less than or equal to 1 mol/L. For example, the concentration of $H^+$ may be 1 mol/L, 0.5 mol/L, 0.1 mol/L, 0.05 mol/L, 0.001 mol/L, and other specific point values. Due to space limitations and for the sake of brevity, no further examples are provided in the present invention.

According to the present invention, an indication of the completion of the leaching in step (1) includes a ratio of $Ce^{4+}$ to a total amount of Ce in the leaching solution is less than or equal to 5% and a concentration of $Ag^+$ is greater than or equal to 0.1 mol/L. When the above indicator is reached, the leaching can be considered to be complete.

In the present invention, the liquid-solid ratio of the acidic solution containing $Ce^{4+}$ and $NO_3^-$ to the silver-containing material during the leaching process is not specifically limited. The above-mentioned liquid-solid ratio can be adjusted according to the range known in the art and the actual situation at the site. In the actual operation process, the silver-containing material in the pipeline may be processed by flowing the acidic solution containing $Ce^{4+}$ and $NO_3^-$ through the pipeline without specifically limiting its liquid-solid ratio.

Similarly, the temperature and time duration of the leaching process are not specifically limited in the present invention, as long as the indicators for the completion of leaching are reached.

In the present invention, before the electrolysis, a purification treatment may optionally be performed on the leaching solution obtained after the leaching in step (1) to separate impurities to meet electrolytic silver products purity requirements.

In the present invention, the leaching solution is electrolyzed by using an electrolytic cell with a diaphragm. The electrolytic cell is separated into a cathode zone and an anode zone by the diaphragm, and the leaching solution enters the electrolytic cell from the cathode zone.

In the present invention, the diaphragm is a component capable of separating the cathode zone and the anode zone and capable of conducting current and ions, including, and may include but is not limited to, an ion membrane or a porous porcelain plate.

According to the present invention, a current density of the anode during the electrolysis in step (2) ranges from 100 A/m² to 4000 A/m². For example, the current density may be 100 A/m², 500 A/m², 1000 A/m², 1500 A/m², 2000 A/m², 2500 A/m², 3000 A/m², 3500 A/m², 4000 A/m², or a specific point value between the above point values. Due to space limitations and for the sake of brevity, no further examples are provided in the present invention.

According to the present invention, a current density of the cathode during the electrolysis in step (2) ranges from 50 A/m² to 700 A/m². For example, the current density can be 50 A/m², 80 A/m², 200 A/m², 300 A/m², 400 A/m², 500 A/m², 600 A/m², 700 A/m², or a specific point value between the above point values. Due to space limitations and for the sake of brevity, no further examples are provided in the present invention.

The above-mentioned current densities of the anode and the cathode are merely examples for better illuminating the present invention, but the invention is not limited thereto. Other current densities that enable the electrolysis to proceed smoothly are also suitable for the present invention.

In the present invention, the solution containing $Ce^{4+}$ obtained after the electrolysis in step (2) may optionally be adjusted, and then returned to the step (1) for recycling. In this process, the solution containing $Ce^{4+}$ and $NO_3^-$ produced at the anode in step (2) needs to be monitored and analyzed. If the solution meets the requirements that the $Ce^{4+}$ concentration is greater than or equal to 0.1 mol/L and the $H^+$ concentration is less than or equal to 1 mol/L, the solution is directly returned to the leaching step for recycling without an adjustment. If the requirements are not met, the solution is returned to the leaching step for recycling after adjusting the electrolytic parameters or adjusting the corresponding components in time to make the components in the solution meet the requirements.

Compared with the prior art, the present invention has at least the advantages as follows.

(1) In the present invention, $Ce^{4+}$ is used instead of nitric acid for leaching metallic silver. During the reaction process based on $Ce^{4+}+Ag \rightarrow Ce^{3+}+Ag^+$, almost no $NO_x$ is generated, which solves the environmental issues of $NO_x$ in traditional nitric acid leaching processes and is a process for cleanly extracting silver.

(2) In the present invention, $Ce^{4+}$ is regenerated and metallic silver is precipitated after electrolysis, thereby enabling recycling of the electrolyte solution. The disclosed leaching-silver extraction process does not consume other chemical reagents, which reduces environmental impacts and production costs.

(3) In the present invention, the silver is extracted by means of solution leaching and electrolytic regeneration, and the $Ag^+/Ag$ standard potential reaches 0.8 V, which compared to traditional methods reduces the voltage and power consumption required for the $Ce^{4+}$ regeneration electrochemical reaction and results in saving costs.

(4) In the present invention, $Ag^+$ has a catalytic effect on the $Ce^{3+}$ electro-oxidation reaction, which improves efficiency compared to traditional methods.

DETAILED DESCRIPTION OF THE EMBODIMENTS

To facilitate understanding of the present application, the present disclosure provides the following embodiments. Those skilled in the art should understand that these embodiments are merely intended to help to understand the present invention and should not be considered as a specific limitation to the present invention.

Embodiment 1

(1) A solution containing 1 mol/L of $Ce(NO_3)_4$, 0.1 mol/L of $AgNO_3$, and 0.01 mol/L of $HNO_3$ is mixed with spent catalysts (containing 0.5% of silver, and with the remainder alumina) for leaching, and the silver is allowed to be leached into the solution. The leaching is completed when a ratio of $Ce^{4+}$ to a total amount of Ce in the leaching solution is less than or equal to 5% and a concentration of Ag is less than or equal to 0.1 mol/L. Then, the obtained leaching solution is filtered to remove residual solids and suspensions to obtain a clarified leaching solution.

(2) The clarified leaching solution obtained in step (1) is added from a cathode zone of an electrolytic cell. The electrolytic cell is separated into inner and outer areas by a plastic frame with a diaphragm. A platinum mesh is placed in the plastic frame as an anode, and a titanium mesh is placed outside the plastic frame as a cathode. The current density of the anode is controlled to be 100 A/m$^2$, the current density of the cathode is controlled to be 50 A/m$^2$, and the leaching solution is electrolyzed. Ag$^+$ is reduced on the titanium mesh to form metallic silver. The electrolyte passes through the diaphragm and undergoes an oxidation reaction at the anode to convert Ce$^{3+}$ to Ce$^{4+}$, and finally, the electrolyte is transferred to a transfer tank. By controlling the electrolytic current and the electrolyte flow rate, the ratio of Ce$^{4+}$ to the total cerium in the solution produced in the anode zone reaches above 70%. The solution in the transfer tank is monitored and analyzed, and the components of the solution are adjusted in time to ensure that the components of the solution meet the requirements that the Ce$^{4+}$ concentration is greater than or equal to 0.1 mol/L and the H$^+$ concentration is less than or equal to 1 mol/L. The regenerated acidic solution containing Ce$^{4+}$ and NO$_3^-$ that meets the requirements is returned to the leaching step and is mixed with the silver-containing material again for the leaching operation.

Embodiment 2

(1) A solution containing 1.6 mol/L of Ce(NO$_3$)$_4$, 0.4 mol/L of Ce(NO$_3$)$_3$ and 0.1 mol/L of HNO$_3$ continuously flows through a pipeline loaded with spent catalysts (containing 15% silver) for leaching, allowing the ratio of Ce$^{4+}$ to the total amount of Ce in the solution at the outlet of the pipeline to be less than 1% and the concentration of Ag$^+$ to be more than 1 mol/L. Then, the obtained leaching solution is filtered to remove residual solids and suspensions, and a clarified leaching solution is obtained.

(2) The electrolysis is carried out in the same electrolytic cell as in embodiment 1. The current density of the anode is controlled to be 500 A/m$^2$, the current density of the cathode is controlled to be 250 A/m$^2$, and the leaching solution is electrolyzed. The metallic silver is obtained at the cathode. The ratio of Ce$^{4+}$ in the total cerium in the solution produced in the anode zone reaches 80% by controlling the electrolytic current and the solution flow rate. The anolyte is transferred to a transfer tank. The solution in the transfer tank is monitored and analyzed, and the compositions of the solution are adjusted in time to ensure that the components of the solution meet the requirements that the Ce$^{4+}$ concentration is stable at 1.6 mol/L and the H$^+$ concentration is stable at 0.1 mol/L. The regenerated acidic solution containing Ce$^{4+}$ and NO$_3^-$ that meets the requirements is returned to the leaching step and mixed with the silver-containing material again for the leaching operation.

Embodiment 3

(1) A solution containing 1.0 mol/L of Ce(NO$_3$)$_4$, 0.5 mol/L of Ce(NO$_3$)$_3$, 1.5 mol/L of AnNO$_3$, and 1 mol/L of HNO$_3$ is mixed with spent catalysts containing 25% silver for leaching. The leaching is completed when a ratio of Ce$^{4+}$ to a total amount of Ce in the leaching solution is less than or equal to 5% and a concentration of Ag$^+$ is less than or equal to 0.1 mol/L. Then, the obtained leaching solution is filtered to remove residual solids and suspensions to obtain a clarified leaching solution.

(2) The clarified leaching solution obtained in step (1) is added from a cathode zone of an electrolytic cell. The electrolytic cell is separated into inner and outer areas by a plastic frame with a diaphragm. A platinum-plated titanium mesh is placed outside the plastic frame as an anode, and the silver plate is placed in the plastic frame as a cathode. The current density of the anode is controlled to be 2000 A/m$^2$, the current density of the cathode is controlled to be 500 A/m$^2$, and the leaching solution is electrolyzed. Ag$^+$ is reduced to metallic silver at the cathode. The electrolyte undergoes an oxidation reaction at the anode to convert Ce$^{3+}$ to Ce$^{4+}$, and then flows from the overflow port of the electrolytic cell to the transfer tank. By controlling the electrolytic current and the solution flow rate, the concentration of Ce$^{4+}$ in the solution produced in the anode zone increases to 1.3 mol/L. The solution in the transfer tank is monitored and analyzed. If the concentration of the solution meets the requirements that the Ce$^{4+}$ concentration is stable at 1.3 mol/L and the H$^+$ concentration is less than or equal to 1 mol/L, then the solution is directly returned to the leaching step for recycling. If the requirements are not met, the electrolyte flow rate is adjusted or the corresponding components are added in time to make the components in the solution meet the requirements, and then the obtained acidic solution containing Ce$^{4+}$ is returned to the leaching step for recycling.

Embodiment 4

(1) A solution containing 1.4 mol/L of Ce(NO$_3$)$_4$, 1 mol/L of AgNO$_3$, and 0.001 mol/L of HNO$_3$ is mixed with silver-copper alloy shavings containing 90% silver for leaching. The leaching is completed when a ratio of Ce$^{4+}$ to a total amount of Ce in the leaching solution is less than or equal to 5% and a concentration of Ag$^+$ is less than or equal to 0.1 mol/L. Then, the obtained leaching solution is filtered to remove residual solids and suspensions. According to the purity requirements of electrolytic silver products, when the copper content in the leaching solution is greater than or equal to 35 g/L, a purification step should be added to extract or adsorb the copper in the leaching solution to reduce the copper concentration in the leaching solution to less than 20 g/L. Fine filtration is performed after the removal of impurities to obtain a clarified leaching solution.

(2) The obtained clarified leaching solution is added from a cathode zone of an electrolytic cell. The electrolytic cell is separated into a plurality of cathode zones and anode zones with a porous porcelain plate and the electrolytic cell is provided with a solution stirring device and a heat exchange device. A platinum mesh is used as an anode and a silver mesh is used as a cathode. The current density of the anode is controlled to be 4000 A/m$^2$, the current density of the cathode is controlled to be 700 A/m$^2$, and the leaching solution is electrolyzed. Ag$^+$ is reduced to metallic silver at the cathode. After analysis, the copper content in the silver product at the cathode is less than 0.01%, which meets the expected requirements. The electrolyte undergoes an oxidation reaction at the anode to convert Ce$^{3+}$ to Ce$^{4+}$. Then, the electrolyte is transferred from the overflow port of the anode zone to the transfer tank. The solution flow rate is controlled so that the concentration of Ce$^{4+}$ in the solution of the transfer tank is greater than or equal to 1 mol/L and the concentration of H$^+$ is less than or equal to 0.1 mol/L, and then the solution is directly returned to the leaching step for recycling. If the solution in the transfer tank does not meet the requirements after analysis, then the components of the solution are adjusted in time to meet the requirements and the obtained solution is returned to the leaching step for recycling.

The applicant declares that in the present disclosure, the above embodiments are used to describe the technical process of the present invention, but the present invention is not limited to the above-mentioned technical process. That is, it does not mean that the present invention must rely on the above specific technical process to be implemented. Those skilled in the art should understand that any improvement to the present invention, selection of specific steps of the present invention, and other situations all fall within the scope of the present invention.

What is claimed is:

1. A method for cleanly extracting metallic silver, comprising the following steps:
    (1) mixing an acidic solution containing $Ce^{4+}$ and $NO_3^-$ with a silver-containing material to obtain a mixture for a leaching; after the leaching is completed, carrying out a solid-liquid separation on the mixture to obtain a leaching solution; and
    (2) electrolyzing the leaching solution obtained in step (1), wherein an oxidation reaction of $Ce^{3+}$ occurs at an anode to obtain a solution containing $Ce^{4+}$ to achieve a regeneration of $Ce^{4+}$, and a reduction reaction of $Ag^+$ occurs at a cathode to obtain the metallic silver.

2. The method according to claim 1, wherein in step (1), a concentration of $Ce^{4+}$ in the acidic solution containing $Ce^{4+}$ and $NO_3^-$ is at least 0.1 mol/L.

3. The method according to claim 1, wherein in step (1), a concentration of $H^+$ in the acidic solution containing $Ce^{4+}$ and $NO_3^-$ is at most 1 mol/L.

4. The method according to claim 1, wherein an indication of completion of the leaching in step (1) includes a ratio of $Ce^{4+}$ to a total amount of Ce in the leaching solution is at most 5% and a concentration of $Ag^+$ is at least 0.1 mol/L.

5. The method according to claim 1, wherein in step (1), the leaching solution is subjected to a purification treatment before the electrolyzing.

6. The method according to claim 1, wherein in step (2), the leaching solution is electrolyzed by an electrolytic cell with a diaphragm, the electrolytic cell is separated into a cathode zone and an anode zone by the diaphragm, and the leaching solution enters the electrolytic cell from the cathode zone.

7. The method according to claim 1, wherein in step (2), during the electrolyzing, a current density of the anode ranges from 100 $A/m^2$ to 4000 $A/m^2$, and a current density of the cathode ranges from 50 $A/m^2$ to 700 $A/m^2$.

8. The method according to claim 1, wherein the solution containing $Ce^{4+}$ in step (2) is returned to step (1) for recycling.

* * * * *